United States Patent [19]

Willis

[11] Patent Number: 4,683,556

[45] Date of Patent: Jul. 28, 1987

[54] METHOD FOR IDENTIFYING ARRIVAL TIMES OF WAVEFORMS ON ACOUSTIC BOREHOLE WELL LOGS

[75] Inventor: Mark E. Willis, Carrollton, Tex.

[73] Assignee: Mobil Oil Corporation, New York, N.Y.

[21] Appl. No.: 706,531

[22] Filed: Feb. 27, 1985

[51] Int. Cl.$^4$ ............................................. G01V 1/00
[52] U.S. Cl. ....................................... 367/27; 367/50; 367/31; 367/33; 367/40
[58] Field of Search ....................... 367/31, 33, 40, 42, 367/39, 50, 27; 181/103; 364/421, 422

[56] References Cited

U.S. PATENT DOCUMENTS

| | | | |
|---|---|---|---|
| Re. 24,446 | 3/1958 | Summers | 181/0.5 |
| 3,333,238 | 7/1967 | Caldwell | 340/18 |
| 3,362,011 | 1/1968 | Zemanek, Jr. | 340/18 |
| 4,210,966 | 7/1980 | Ingram | 367/31 |
| 4,223,399 | 9/1980 | Hackett | 367/41 |
| 4,367,541 | 1/1983 | Seeman | 367/31 |
| 4,383,308 | 5/1983 | Caldwell | 367/31 |
| 4,543,648 | 9/1985 | Hsu | 367/33 |

FOREIGN PATENT DOCUMENTS 1152201  8/1983  Canada ................................. 349/8

OTHER PUBLICATIONS

"A New Method of Shear-Wave Logging", *Geophysics*, vol. 45, No. 10, (Oct. 1980), pp. 1489-1506, by Choro Kitsunezaki.

*Seismic Exploration Fundamentals*, by J. A. Coffeen, The Petroleum Publishing Co., Tulsa, Okla., 1978, pp. 115-118.

*Encyclopedia Dictionary of Exploration Geophysics*, by R. E. Sheriff, Society of Exploration Geophysicists, Tulsa, Okla., 1973, pp. 42, 192-193.

*Primary Examiner*—Thomas H. Tarcza
*Assistant Examiner*—Daniel T. Pihulic
*Attorney, Agent, or Firm*—Alexander J. McKillop; Michael G. Gilman; George W. Hager, Jr.

[57] ABSTRACT

A well logging tool employing at least one transmitter and at least one receiver is incrementally advanced through a borehole. A plurality of recorded well log traces from successive ones of the incremental depth points for a single transmitter-receiver pair are correlated to identify a moveout trend for the recorded waveforms about the measured arrival time of the waveform on the center trace of such plurality of traces. A second correlation of the center trace of the plurality of traces with the next successive depth trace is carried out in accordance with the identified moveout trend to determine the arrival time of the acoustic waveform on such next successive depth trace with respect to the measured arrival time of the center trace.

6 Claims, 8 Drawing Figures

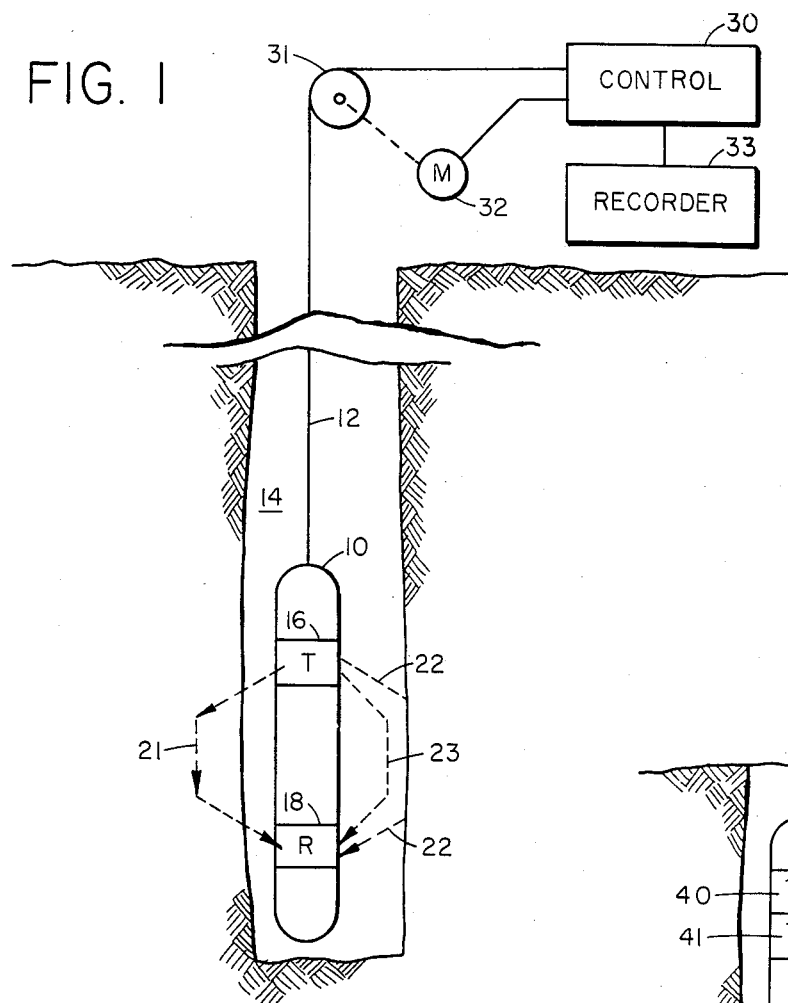
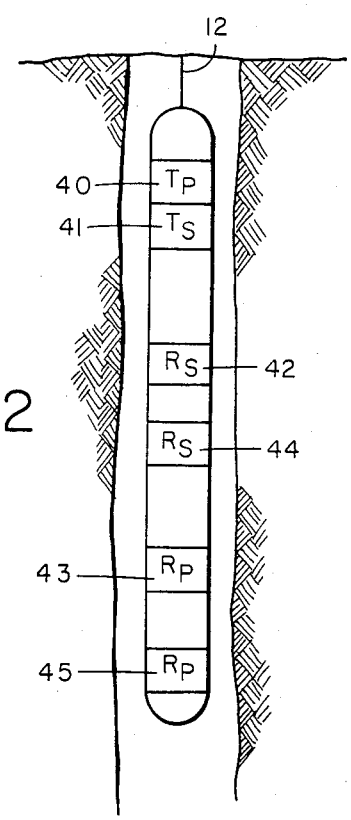

METHOD FOR IDENTIFYING ARRIVAL TIMES OF WAVEFORMS ON ACOUSTIC BOREHOLE WELL LOGS

BACKGROUND OF THE INVENTION

It has long been known to acoustically log open wellbores to determine the velocities of compression ("P") waves and shear ("S") waves traveling through rock formations located in the wellbore region. Logging devices have been used for this purpose which normally comprise a sound source (i.e., transmitter) and one or more receivers disposed at pre-selected distances from the sound sources. The use of remotely spaced, multiple receivers is intended to aid in distinguishing between various arriving wave fronts since travel time differentials increase with increasing distance from the transmitter, as described in U.S. Pat. No. 4,383,308 to R. L. Caldwell.

Such arriving wave fronts generally include both headwaves and guided waves. A first arriving event is the headwave commonly called a compressional wave which represents acoustic energy which has been refracted through the formation adjacent the wellbore. This compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

A second arriving event is the headwave commonly called a shear wave which is also refracted through the formation adjacent the wellbore. Unlike the compressional wave, the shear wave travels at shear velocity through the formations. The particles of the formation along the path of propagation are vibrated in a direction perpendicular to the direction of the propagation of the wave.

A third arriving event is the guided wave commonly called a tube wave or Stoneley wave which causes a radial bulging and contraction of the borehole and its travel is by way of the borehole wall, that is, the boundary between the borehole fluids and the formation solids.

A fourth arriving event is the guided wave commonly called a normal mode, pseudo-Rayleigh wave, or reflected conical wave. The travel of this normal mode is restricted to the borehole and has an oscillatory pattern normal to its direction of travel. Normally, the shear wave is indistinguishable from the onset of this normal mode due to concurrent arrival times.

Various signal timing and wave front analysis methods have been suggested for distinguishing between these various wave fronts received at a given receiver. Most of these methods involve timing circuits which anticipate the receipt of, and facilitate the collection of, such wave front information. For descriptions of various logging techniques for collecting and analyzing acoustic wave data, please refer to U.S. Pat. Nos. 3,333,238 (Caldwell); 3,362,011 (Zemanek, Jr.); Reissue No. 24,446 (Summers); and 4,383,308 (Caldwell).

In the design of such acoustic logging tools, various types of transmitters, such as piezoelectric or magnetostrictive transmitters, have been suggested for creating the acoustic logging signals. For conventional logging operations, most such transmitters have been centrally located in the borehole, and have been adapted to generate sound which is radiated in a multidirectional (360°) pattern from the transmitter to adjacent wellbore surfaces. Such transmitters are well suited for creating compression waves in surrounding rock and sand formations.

Recently, attention has been directed to developing transmitters which are particularly suited to shear wave logging. Such transmitters generally attempt to achieve a single point force application of sound energy to the borehole wall. The theory behind point force transmitters, as generally outlined in "A New Method of Shear-Wave Logging", *Geophysics*, Vol. 45, No. 10 (Oct. 1980), pp. 1489–1506, by Choro Kitsunezaki, is that they are capable of directly generating shear waves. Conventional multidirectional transmitters are said to be capable only of indirectly creating shear waves. Point force type transmitters produce shear waves of substantially higher amplitudes than heretofore possible with conventional multidirectional compression wave transmitters. Accordingly, formations, such as loosely consolidated or unconsolidated sand, which do not propagate shear waves in sufficient amplitudes to permit definitive detection using conventional compression wave receivers, may now be shear wave logged with these shear wave logging systems. Canadian Pat. No. 1,152,201 to Angona and Zemanek, Jr. describes a shear wave acoustic logging system employing such a point force transmitter for the shear wave generation.

SUMMARY OF THE INVENTION

In accordance with the present invention, there is provided a method for identifying the arrival times of waveforms on an acoustic borehole well log obtained by running a borehole logging tool having at least one acoustic transmitter and at least one acoustic receiver through a borehole and activating the transmitter at a plurality of spaced-apart depth points within the borehole. An acoustic trace is obtained of the acoustic energy transmission from the transmitter to the receiver through the earth formations surrounding the borehole at each of the plurality of depth points.

From such a recorded well log, a plurality of at least three successive depth point traces are selected for a single transmitter-receiver pair. The arrival time of the acoustic signal along the trace of the center trace of the selected plurality of successive traces is measured. A first window is then placed about this measured arrival time on the center trace and is further positioned across each of the remaining plurality of traces with a linear moveout function between the traces. A first n-fold correlation is performed on those portions of the plurality of successive traces which lie within such first window portions as positioned across such traces. The window is thereafter incrementally pivoted about its fixed position on the center trace thereby repositioning the window in accordance with the linear moveout function cross each of the remaining plurality of successive traces. At each incremental position, an n-fold correlation is performed on those portions of the successive traces which lie within the incrementally pivoted window positions. A moveout trend is identified for the arrival times of the acoustic wave across the plurality of successive traces based on the n-fold correlation yielding the best signal coherence among the incremented first window positions across the plurality of successive traces.

This identified moveout trend is then employed in a second correlation operation. A second window is positioned across the center trace and only the next successive trace in accordance with the identified moveout trend. A two-fold correlation is then performed on those portions of the center trace and the next successive trace which lie within such trend-positioned second window. The arrival time of the acoustic wave on the next successive trace is identified with respect to the measured arrival time of the acoustic wave on the center trace based on the two-fold correlation yielding the best signal coherence between the center trace and the next successive trace lying within such second window. Both the n-fold and two-fold correlation steps are repeated for each sequential grouping of plurality of successive traces from a single transmitter-receiver pair along the borehole.

In a further aspect of the invention and after all the correlation steps have been completed for a first direction of movement through the borehole, such as upwardly, for example, the correlation steps are repeated for a second and opposite direction of movement, such as downwardly. The arrival time for the next successive depth trace is thereafter determined by averaging the arrival times found in the correlation operations for each of the opposite movement directions through the borehole.

In a still further aspect, the logging tool is moved through the borehole such that the plurality of successive traces are obtained from depth points separated by less than a half wave period of the acoustic energy as it travels through the formation between such depth points.

BRIEF DESCRIPTION OF THE DRAWINGS

FIG. 1 is a diagrammatic representation of a well logging system employed to measure acoustic waves in formations adjacent a borehole.

FIG. 2 is a diagrammatic illustration of an alternate embodiment of the well logging system of FIG. 1.

DESCRIPTION OF THE PREFERRED EMBODIMENT

Figure 3:
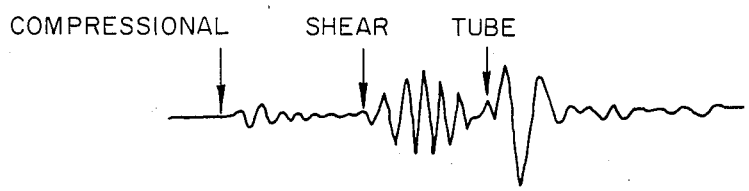
FIG. 3 illustrates a representative set of acoustic waveforms that might be received by the logging systems of FIGS. 1 and 2 while measuring acoustic waves in formations adjacent to a borehole.

The method of the present invention identifies the arrival times of compressional, shear and tube waves on borehole well logs obtained by means of a conventional acoustic borehole logging system. The simplest acoustic logging system consists of a single transmitter and receiver as illustrated in FIG. 1. The logging tool 10 is suspended by cable 12 for movement along the length of the borehole 14. The logging tool includes an acoustic source or transmitter 16 for the production of repetitive time-spaced pulses of acoustic energy. An acoustic detector or receiver 18 detects the generated acoustic pulses after their travel through the surrounding formations and converts them into representative electrical signals. The uphole components include a surface control panel 30 to which the cable 12 is directed over the sheave 31. A motor 32, which is controlled from the surface control panel 30, operates the sheave 31 for raising and lowering the logging tool 10 in the borehole 14. An output means, such as a digital recorder 33 is electrically connected to the surface control panel for recording and/or displaying the data detected from the logging tool 10.

An alternate embodiment for the borehole logging tool 10 for use in carrying out the method of the present invention is shown in FIG. 2. Acoustic energies are generated from a multidirectional compression wave (P) transmitter 40 and a point force shear wave (S) transmitter 41. The multidirectional compression wave (P) transmitter 40 may be a piezoelectric or magnetostrictive transducer of the type known for producing suitably recordable compression waves. The shear wave (S) transmitter 41 may be of the type described in the aforementioned *Geophysics* article, "A New Method For Shear-Wave Logging," by Kitsunezaki or of the bender type point force described in the aforementioned Canadian patent.

Suspended below the transmitters 40 and 41 is at least one shear wave (S) receiver 42 and at least one compression wave (P) receiver 43. Receiver 42 is preferably of the aforementioned bender type transducer and receiver 43 is preferably of the piezoelectric or magnetostrictive type transducer. In a preferred embodiment, shear wave receiver 42 is located about 4 to 6 feet below shear wave transmitter 41, and compression wave receiver 43 is located about 13 to 17 feet below compression wave transmitter 40. It should be noted that the use of separate receivers, as shown in FIG. 2, will result in separate waveform recordings as contrasted with the combined single waveform recording of FIG. 1. Additional shear and compressional receivers 44 and 45, respectively, may also be incorporated.

For more details and a more thorough understanding of the uphole recording of the acoustic waves detected by the borehole logging tool of FIGS. 1 and 2, reference may be made to the aforementioned U.S. Pat. Nos. 3,333,238 (Caldwell); 3,362,011 (Zemanek, Jr.); Reissue No. 24,446; and 4,383,308 (Caldwell).

Having set forth above alternate borehole logging systems of FIGS. 1 and 2, as well as in the above-referenced U.S. patents, the method of the present invention for identifying the arrival times of select acoustic wave recordings from such systems will now be described. The logging tool 10 of FIG. 1 is initially lowered to the vicinity of the bottom 50 of the borehole 14. The acoustic source or transmitter 16 is energized. Some of the generated acoustic energy will be received directly by the receiver 18 as compressional and shear waves by way of path 21 adjacent the borehole, as tube waves by way of path 22 along the borehole wall, and as the normal mode by way of path 23 within the borehole.

FIG. 3 is representative of a set of such acoustic waveforms as they might be received by the receiver 18 as the logging tool is advanced through the borehole. Compressional and tube waves are identified as P and T waves, respectively. Since the shear wave is indistinguishable from the onset of the normal mode due to concurrent arrival times at the receiver, both are identified together as S waves in FIG. 3 and will be hereinafter referred to collectively as S acoustic waves.

After the recording of these acoustic waves, the arrival times of selected ones of said waves is determined in accordance with the method of the present invention. The method utilizes the fact that the arrival time of a particular wave type at the same receiver changes slowly as the logging tool is advanced through the borehole. Thus, the arrival time at the current depth point is very close to the arrival time at the next successive depth point. It is desirable to carrying out the borehole logging operation by advancing the tool at a speed such that the arrival time at the next depth point is always less than a half wave period away. This defines the time window on the next trace within which to look for the wave type arrival.

The method uses a selected plurality of three or more successive depth traces from a single source-receiver pair at a time independently of all other possible source-receiver pairs of the logging tool. For such a single source-receiver pair, the arrival time of a particular wave type (i.e., P, S or T) at the center trace of the selected plurality of traces is measured manually from visual observation. The arrival time of the same wave type on the next successive trace is desired. It is found from a two-step correlation technique.

Figure 4:
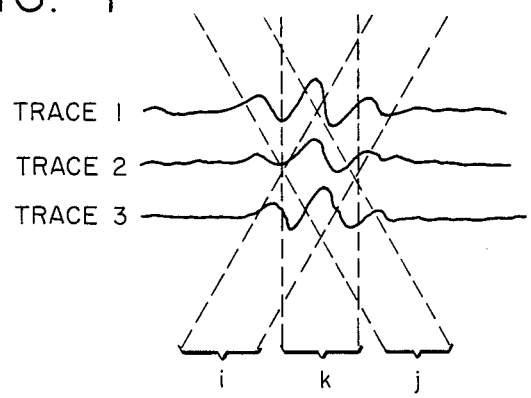
FIGS. 4 and 5 are graphic representations of the correlation technique used in carrying out the method of the present invention.
Figure 5:
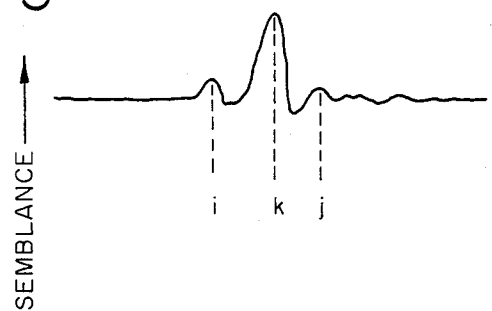

Firstly, an n-fold semblance correlation is performed on the selected plurality of traces. As illustrated in the example of FIG. 4, a three-fold semblance correlation is performed on the traces 1, 2 and 3 taken from successive depth points by a single source-receiver pair as the logging tool is moved through the borehole. A linear moveout function is used between the traces. The correlation is performed within a window beginning at the manually measured arrival time for that wave type. The moveout function then pivots about the fixed window on the center trace and moves across the other two traces as illustrated in FIG. 4 by the windows i, j and k. The best coherence defines a trend across the traces for that particular wave type, as illustrated in FIG. 5. Basically, the arrival times across the three traces form a locally linear moveout pattern when there is no velocity change in the medium. However, at formation boundaries or interfaces, there is a velocity change and the pattern shows a distinct change from the linear moveout.

Utilizing the trend found in the coherence of the first correlation step, as illustrated, for example, by the best lag k in FIG. 5, a second correlation step is performed. This second step is a two-fold crosscorrelation utilizing the direction of the trend found from the three-fold semblance correlation step. Utilizing the trend direction, the center trace and the next successive trace in depth are correlated in similar manner to that illustrated in FIG. 4 for the three-fold correlation during the first correlation step. The correlation yielding the best lag in similar manner to that of FIG. 5 identifies the arrival time of the acoustic wave on the next successive trace with respect to the arrival time of the measured wave on the center trace.

Each of these correlation operations is well known in the art and a detailed description of them is not necessary. Correlation generally is described in *Seismic Exploration Fundamentals*, by J. A. Coffeen, The Petroleum Publishing Co., Tulsa, Okla., 1978, pages 115–118, while both crosscorrelation and semblance correlation are described in detail in the *Encyclopedia Dictionary of Exploration Geophysics*, by R. E. Sheriff, Society of Exploration Geophysicists, Tulsa, Okla., 1973, pg. 42, and pps. 192–193, respectively. Briefly, however, crosscorrelation is a measure of the similarity of two waveforms, of the degree of linear relationship between them, or of the extent to which one is a linear function of the other. Semblance correlation is a measure of multichannel coherence. It is the energy of a sum trace divided by the mean energy of the components of the sum. It can also be described as the normalized output/input energy ratio resulting from stacking several channels for a time-shifting of the channels before stacking. This is equivalent to the zero-log values of the autocorrelations of the component traces. Further reference to such correlation operations may be made to the detailed description found in U.S. Pat. No. 4,223,399 (Col. 7) to Hackett.

Figure 6:
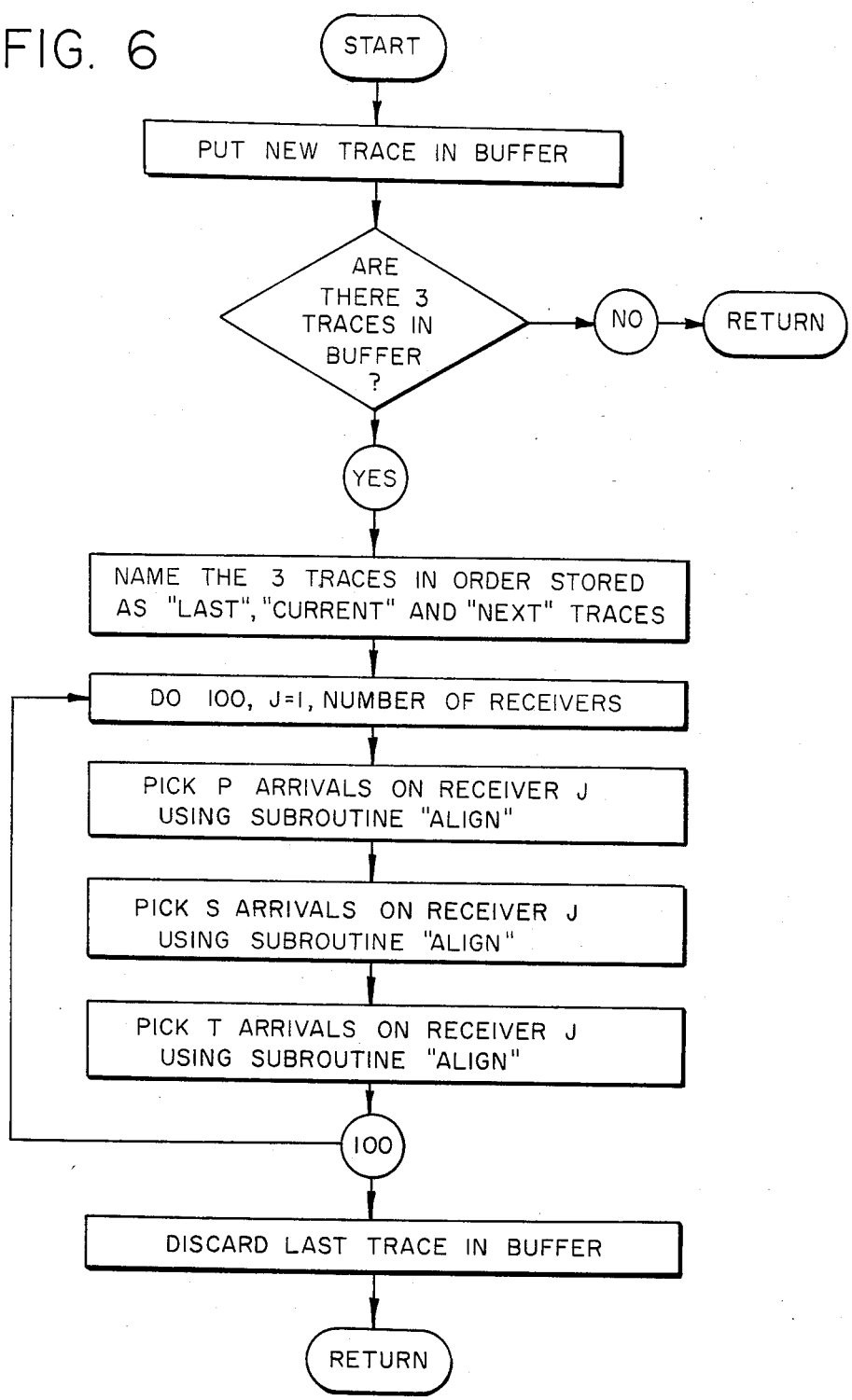
FIGS. 6, 7A and 7B are flow charts of an algorithm used to carry out the correlation technqiue illustrated in FIGS. 4 and 5.
Figure 7A:
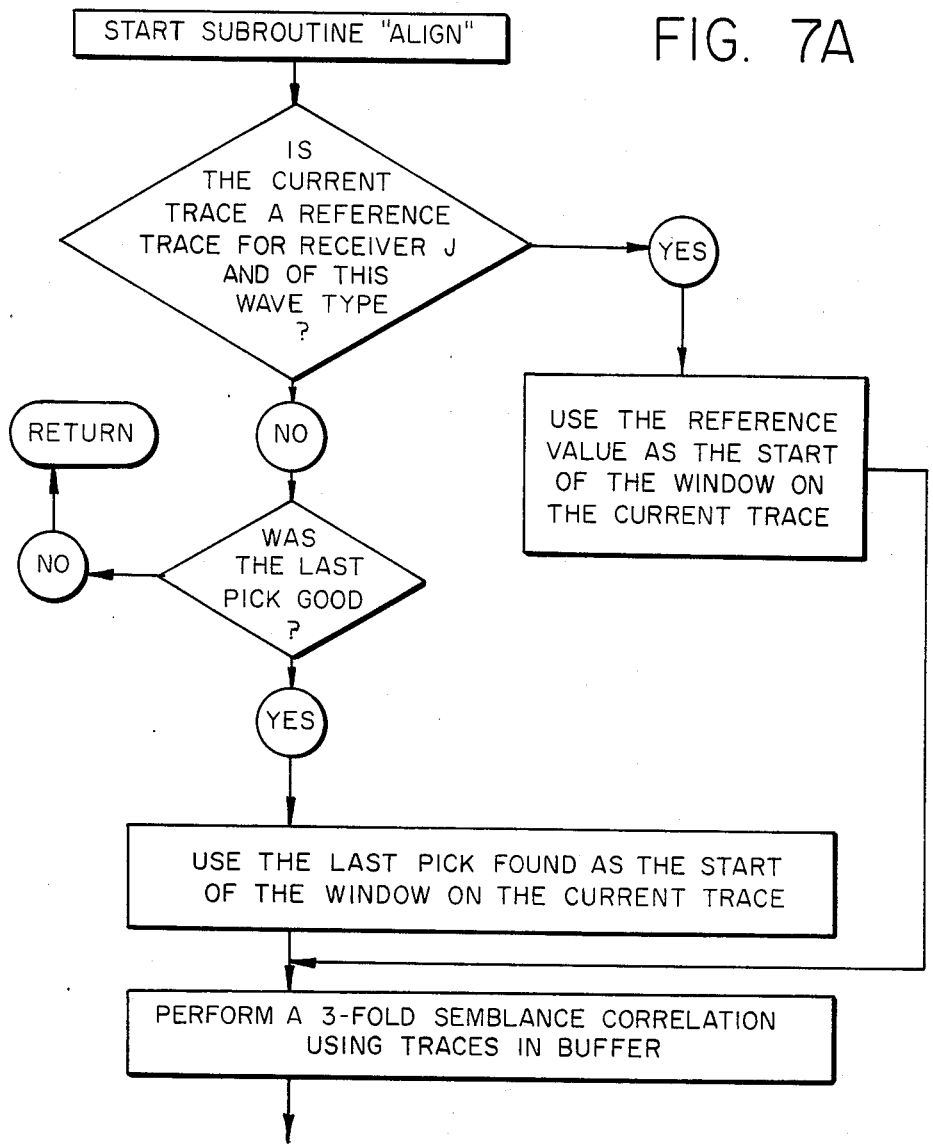
Figure 7B:
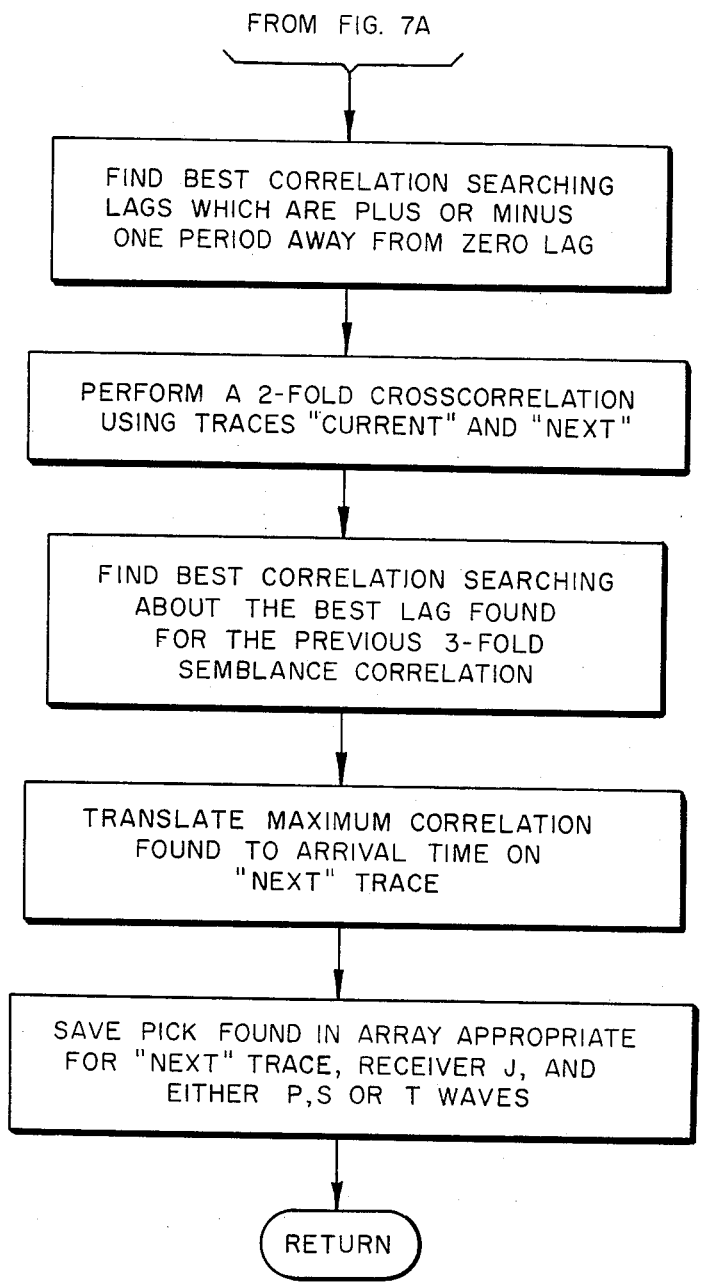

In addition, a flow chart of one algorithm utilized to carry out such correlation operation for both the first three-fold correlation step and the second two-fold correlation step of the present invention of successive depth point traces for a single transmitter-receiver pair of a borehole logging tool is shown in FIGS. 6, 7A and 7B.

While a preferred embodiment of the method of the present invention has been described and illustrated, numerous modifications or alterations may be made without departing from the spirit and scope of the invention as set forth in the appended claims.

I claim:

1. A method for identifying the arrival times of waveforms on an acoustic borehole well log obtained by running a borehole logging tool having at least one acoustic transmitter and at least one acoustic receiver through a borehole and activating said transmitter at a plurality of spaced-apart depth points within the borehole so that an acoustic trace is obtained of the transmission of acoustic energy from the transmitter to the receiver through the earth formations surrounding the borehole at each of said plurality of depth points, comprising the steps of:
   (a) selecting a plurality of at least three successive depth point acoustic traces from a single transmitter-receiver pair,
   (b) measuring the arrival time of the acoustic wave on the center trace of said plurality of traces from visual observation,
   (c) placing a first window about the arrival time of the acoustic signal along the trace of the center trace of said selected plurality of successive traces,
   (d) positioning said first window across each of the remaining plurality of successive traces with a linear moveout function between the traces,
   (e) performing a first n-fold correlation on those portions of said plurality of successive traces which lie within said first window positions across said traces,
   (f) incrementally pivoting said first window about its fixed position on said center trace thereby repositioning said first window in accordance with the linear moveout function across each of the remaining plurality of successive traces,
   (g) performing additional n-fold correlations on the portions of said plurality of successive traces which lie within each of the incrementally pivoted first window positions,
   (h) identifying a trend for the arrival times of the acoustic wave across said plurality of successive traces based on the n-fold correlation yielding the best signal coherence among the incremental first window positions across said plurality of successive traces,
   (i) employing said trend to position a second window across said center trace and the next successive trace in depth within the borehole, (j) performing a two-fold correlation on those portions of said center trace and said next successive depth trace which lie within said second window, (k) identifying the arrival time of the acoustic wave on said next successive depth trace with respect to the measured arrival time of the acoustic wave on the center trace based on the correlation yielding the best signal coherence between said center trace and said next successive depth trace within said second window, and (l) repeating steps (c) through (k) for each sequential grouping of said plurality of successive traces along said borehole.

2. The method of claim 1 wherein:

(a) steps (c) through (k) are carried out on sequential groupings of said plurality of successive traces in an upward direction through the borehole, and (b) steps (c) through (k) are carried out on sequential groupings of said plurality of successive traces in a downward direction through the borehole.

3. The method of claim 2 wherein the arrival time of said next successive depth trace is determined by averaging the arrival times found in steps (a) and (b) of claim 2.

4. The method of claim 3 wherein the logging tool is moved through the borehole such that said plurality of successive traces are obtained from depth points separated by less than a half wave period of said acoustic energy as it travels through the formation between said depth points.

5. The method of claim 1 wherein the steps of performing n-fold correlations are semblance correlation operations.

6. The method of claim 1 wherein the step of performing a two-fold correlation is a crosscorrelation operation.

* * * * *